United States Patent
Morgenroth

(10) Patent No.: US 11,530,724 B2
(45) Date of Patent: Dec. 20, 2022

(54) ELECTROMAGNETIC FRICTION DISK CLUTCH, AUXILIARY UNIT OF AN INTERNAL COMBUSTION ENGINE, AND METHOD

(71) Applicant: LICOS TRUCKTEC GMBH, Markdorf (DE)

(72) Inventor: Joschua Morgenroth, Friedrichshafen (DE)

(73) Assignee: LICOS Trucktec GmbH, Markdorf (DE)

( * ) Notice: Subject to any disclaimer, the term of this patent is extended or adjusted under 35 U.S.C. 154(b) by 20 days.

(21) Appl. No.: 17/079,826

(22) Filed: Oct. 26, 2020

(65) Prior Publication Data
US 2021/0123484 A1 Apr. 29, 2021

(30) Foreign Application Priority Data
Oct. 29, 2019 (DE) ...................... 10 2019 129 134.8

(51) Int. Cl.
*F16D 27/112* (2006.01)
*F16D 27/00* (2006.01)
*F16D 27/14* (2006.01)

(52) U.S. Cl.
CPC .......... *F16D 27/004* (2013.01); *F16D 27/112* (2013.01); *F16D 27/14* (2013.01); *F16D 2250/0084* (2013.01)

(58) Field of Classification Search
CPC .............................................. F16D 27/00–14
See application file for complete search history.

(56) References Cited

U.S. PATENT DOCUMENTS

| | | | |
|---|---|---|---|
| 3,727,736 A | 4/1973 | Miller et al. | |
| 4,718,526 A | 1/1988 | Koitabashi | |
| 2004/0000460 A1 | 1/2004 | Jacobson et al. | |
| 2006/0165539 A1* | 7/2006 | Boffelli | F01P 5/12 417/319 |
| 2008/0142327 A1* | 6/2008 | Shchokin | F16D 27/112 192/21.5 |
| 2013/0112523 A1* | 5/2013 | Ikegawa | F16D 27/105 192/74 |

FOREIGN PATENT DOCUMENTS

WO 2015/166458 A1 11/2015

OTHER PUBLICATIONS

German Search Report (Application No. 10 2019 129 134.8) dated Jul. 6, 2020.

\* cited by examiner

*Primary Examiner* — David R Morris
(74) *Attorney, Agent, or Firm* — Burr & Brown, PLLC

(57) ABSTRACT

An electromagnetic friction disk clutch with a shaft, an electromagnet arrangement, a rotor for driving the shaft, and an armature disk which is connected to the shaft and moveable in a sprung manner in a direction which is axial to a shaft axis. In a shifting state of the friction disk clutch, the armature disk can be connected to the rotor in a frictionally locking manner, the rotor being mounted rotationally by a rotor bearing unit with respect to the housing section and with respect to the shaft, a magnetic effect is generated for connecting the armature disk to the rotor. The rotor bearing unit is offset with respect to the electromagnet arrangement in an axial direction with respect to the shaft, and overlaps the electromagnet arrangement in the axial direction with respect to the shaft.

16 Claims, 4 Drawing Sheets

ELECTROMAGNETIC FRICTION DISK CLUTCH, AUXILIARY UNIT OF AN INTERNAL COMBUSTION ENGINE, AND METHOD

This application claims the benefit under 35 USC § 119(a)-(d) of German Application No. 10 2019 129 134.8 filed Oct. 29, 2019, the entirety of which is incorporated herein by reference.

FIELD OF THE INVENTION

The present application relates to an electromagnetic friction disk clutch, auxiliary unit of an internal combustion engine and method.

BACKGROUND OF THE INVENTION

Switchable electromagnetic friction disk clutches in the case of vehicles with a combustion engine or an internal combustion engine are known, for example, as part of a drive of an auxiliary unit of the internal combustion engine, such as a water pump or a fan of a cooling system of the motor vehicle. Electromagnetically actuable friction disk shifting clutches are used as a rule for operating the auxiliary unit.

SUMMARY OF THE INVENTION

It is an object of the present invention to provide an improved electromagnetic friction disk clutch for a drive of an auxiliary unit of an internal combustion engine or combustion engine of a vehicle, which friction disk clutch is economically and technically advantageous in comparison with previous friction disk clutches, and which, in particular, is of compact construction and easy to assemble and develops an optimized magnetic action.

The present invention proceeds from an electromagnetic friction disk clutch with a shaft which, in the assembled state, extends through at least one housing section, comprising an electromagnet arrangement, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in a frictionally locking manner, the rotor being mounted rotationally by means of a rotor bearing unit with respect to the housing section and with respect to the shaft, it being possible for a magnetic effect to be generated by way of an energization of the electromagnet arrangement for the connection of the armature disk to the rotor, which magnetic effect moves the armature disk in such a way that the armature disk can be connected to the rotor in a frictionally locking manner.

The housing section is to be understood to mean, in particular, a section which is stationary. The housing section is preferably a section of an apparatus housing and/or an auxiliary unit housing, which section lies completely or at least partially on the outside, which auxiliary unit can be operated by way of the friction disk clutch according to the invention, such as a housing section of the pump housing or a water pump arrangement if the friction disk clutch is provided for a water pump, for example, of a cooling circuit.

The core concept of the present invention lies in the fact that the rotor bearing unit is offset with respect to the electromagnet arrangement in an axial direction with respect to the shaft, the rotor bearing unit being in overlap with the electromagnet arrangement in the axial direction with respect to the shaft. In this way, the rotor bearing unit and the electromagnet arrangement are present axially with respect to the shaft in the viewing direction or in an end view or so as to overlap in the longitudinal direction or behind one another. In this way, a reduction of the dimension of the friction disk clutch in diameter or in the radial direction with respect to the shaft is realized in comparison with the previous arrangement, in the case of which the electromagnet arrangement and the rotor bearing unit are present installed next to one another in a direction which is radial with respect to the longitudinal axis of the shaft. A diameter reduction typically by, for example, a third can be achieved by way of the invention in comparison with known comparable friction disk clutches. This increases, in particular, the possible uses of the friction disk clutch according to the present invention.

The present invention relates, in particular, to an electromagnetic friction disk clutch which forms a part of a drive of an auxiliary unit of an internal combustion engine, such as a motor vehicle internal combustion engine. The friction disk clutch belongs, for example, for driving a pump for cooling fluid and/or a fan unit with a rotatable fan impeller. The friction disk clutch preferably belongs to a water pump clutch which is configured as a two-speed water pump clutch. In addition to the frictionally locking connection of clutch partners, a friction disk clutch of this type preferably provides an additional drive action which operates without a frictionally locking connection in accordance with the eddy current principle.

The rotor of the friction disk clutch is preferably driven, for example, via a belt drive arrangement. The rotational axes of the rotor and the shaft as a rule or preferably coincide or are concentric with respect to one another.

The electromagnet arrangement is present, for example, in a radial dimensional region of the friction disk clutch, which dimensional region lies within a radial width dimension of the bearing unit. In particular, the electromagnet arrangement comprises a coil body and magnetically conducting means which surround the latter at least partially, there being a radial width dimension of the coil body with magnetic conducting means which are adjacent with respect to the coil body within a radial width dimension of the rotor bearing unit. The rotor bearing unit is preferably a rolling-body bearing unit with the rolling bodies between two bearing rings of the rotor bearing unit.

The armature disk is mounted concentrically with respect to the rotor, and can be brought into a frictionally locking connection with a mating section of the rotor or a component which is connected to the rotor.

The mating section is preferably a single-piece constituent part of the rotor. The rotor is mounted rotationally by means of the rotor bearing unit on, for example, a bearing section, and can, therefore, be rotated relative to the housing and is mounted rotationally relative to the shaft. The bearing section is preferably a single-piece core component of the friction disk clutch.

The present invention also extends to an electromagnetic friction disk clutch with a shaft which, in the assembled state, extends through at least one housing section, comprising an electromagnet arrangement, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in a frictionally locking manner, the rotor being mounted rotationally by means of a rotor bearing unit with respect to the housing section and with respect to the shaft, it being possible for the armature disk to be connected to the rotor in a frictionally locking manner by way of a permanent magnet arrangement of the friction disk clutch, it being possible for a magnetic effect to be generated by way of an energization of the electromagnet arrangement for the disconnection of the armature disk from the rotor, which magnetic effect counteracts the magnetic effect of the permanent magnet arrangement in such a way that a movement of the armature disk takes place in such a way that a frictionally locking connection of the armature disk to the rotor can be canceled. According to the present invention, the rotor bearing unit is offset with respect to the electromagnet arrangement in an axial direction with respect to the shaft, the rotor bearing unit being in overlap with the electromagnet arrangement in the axial direction with respect to the shaft. In this way what is known as a 100% fail-safe clutch of radially compact design is provided. This is advantageous, since, in particular, in the case of a failure of the electric supply of the electromagnet arrangement, a drive of the auxiliary unit nevertheless takes place. Here, a cooling circuit is forcibly set up on account of the permanent-magnetic frictionally locking connection of the armature disk to the rotor, a cooling function always taking place, with the result that negative effects as a result of overheating of the internal combustion engine are ruled out.

In the vicinity of the rotor bearing unit, there is advantageously a locking section made from a non-magnetizable material for influencing a magnetic flux in the case of energization of the electromagnet arrangement or in the case of the presence of a permanent magnet arrangement. In this way, the magnetic flux and therefore a desired optimized magnetic effect of the electromagnet arrangement are achieved in the energized state of the electromagnet arrangement or in the case of an active permanent magnet arrangement. Magnetic short circuit currents through the rotor bearing unit are therefore prevented or at least reduced to a tolerable magnitude, with the result that a sufficient frictionally locking action for the transmission of torque is ensured.

The locking section material is preferably magnetically impermeable or magnetically insulating or has a comparatively high magnetic resistance. The locking section material is, for example, a material on the basis of a plastic or an aluminum material or a ceramic or mineral material or a non-magnetic or a magnetic material.

The locking section is configured, for example, as an annular sleeve from the material which is not magnetically conductive or is poorly magnetically conductive. The locking section is preferably closed circumferentially with respect to the shaft. The locking section is connected to the rotor or, as an alternative, is a part of the rotor.

An advantage arises if the locking section is present in an offset manner with respect to the rotor bearing unit, as viewed in the radial direction with respect to the shaft.

The locking section is preferably adjacent with respect to the rotor bearing unit, and is preferably directly adjacent with respect to the rotor bearing unit or with respect to a radial outer side of the rotor bearing unit. The locking section is preferably present, as viewed radially with respect to the shaft, on a side of the rotor bearing unit, which side faces away from the shaft, or which is present radially on the outside with respect to the friction disk clutch, or is between the rotor bearing unit and a radially outer side of the rotor or the friction disk clutch.

Furthermore, it is advantageous if the locking section extends over the axial length of the rotor bearing unit, as viewed in the axial direction with respect to the shaft. The locking section preferably extends over at least approximately or over the entire axial length of the rotor bearing unit, preferably over an axial length of precisely one of the two axial outer sides of the rotor bearing unit.

In this way, the shielding or non-magnetizing action of the locking section is effective on the entire relevant side of the rotor bearing unit, preferably over the entire axial length of the rotor bearing unit.

The locking section preferably projects somewhat beyond the axial length of the rotor bearing unit or projects somewhat at at least one axial end of the rotor bearing unit. The locking section preferably projects only at precisely one of the two opposite axial ends or longitudinal ends of the rotor bearing unit. One axial end of the locking section, in particular, one end of the locking section, which end projects in the axial direction at the rotor bearing unit, preferably reaches as far as close to the armature plate or reaches as far as into the region of the armature plate or reaches as far as an axial side of the armature plate, which axial side faces the rotor bearing unit.

An axial spacing between the end of the locking section and the relevant side of the armature disk preferably lies in the millimeter range.

In accordance with a further advantageous variant of the present invention, one end of the locking section, which end faces the armature disk, extends within a radial width of a frictionally locking section of the armature disk, as viewed in the radial direction with respect to the shaft. In this way, magnetic flux lines between the rotor and the armature disk are advantageously influenced or guided.

It is advantageous if a radial width dimension of the locking section is smaller than or equal to the radial width dimension of the frictionally locking section of the armature plate.

That end of the locking section which faces the armature disk or an associated end side of the locking section is preferably positioned approximately centrally with respect to the frictionally locking section of the armature disk, as viewed radially.

Moreover, it is advantageous that the rotor bearing unit consists of a non-magnetizable material, for influencing a magnetic flux in the case of energization of the electromagnet arrangement. This is also advantageous in the case of one embodiment with a permanent magnet arrangement or a 100% fail-safe variant. Influence in this way, undesired magnetic short circuit flux effects can be avoided or minimized, by it being possible for the magnetic flux which is generated by the electromagnet arrangement to be configured substantially or completely outside the rotor bearing unit.

Furthermore, it is proposed that the rotor bearing unit is present between the armature disk and the electromagnet arrangement in the axial direction with respect to the shaft. This is advantageous with regard to an assembly situation of the friction disk clutch on, for example, an auxiliary unit.

In accordance with one alternative advantageous variant of the invention, the electromagnet arrangement is present between the armature disk and the rotor bearing unit in the axial direction with respect to the shaft. This is another friction disk clutch of radially compact design.

In accordance with one preferred refinement of the present invention, there is a core component which is mounted on the shaft by way of an inner bearing.

The preferably single-piece core component is made from a magnetically conductive material, such as a steel material. The core component is present within the housing, and is preferably present in an annularly closed manner around the shaft. The core component preferably has a narrow sleeve section which extends in the axial direction, for example, in a cylindrical shape, and a narrow flange section which extends at an angle in the radial direction with respect to the sleeve section.

The core component is, for example, L-shaped in radial section.

Another advantage of the present invention arises if the rotor is mounted such that it can be rotated relative to the core component by means of the rotor bearing unit. In this way, a friction disk clutch is possible which is of compact design and is formed by way of components which are oriented precisely among one another. The core component is preferably configured in such a way that, in its axial extent with respect to the shaft, it extends over at least a substantial axial length of the friction disk clutch.

The rotor bearing unit, for example, an anti-friction bearing, is preferably received or its inner ring is preferably arranged on, for example, a radially outer circumferential face of the core component or the sleeve section.

The electromagnet arrangement with the coil or with the coil and casting compound which surrounds it on the core component is preferably received on the core component or on the sleeve section on the outside on a section which is adjacent with respect to the section with the rotor bearing unit. Therefore, the length of the core component or preferably the axial length of the sleeve component covers at least the axial length of the rotor bearing unit and the axial length of the electromagnet arrangement in the axial extent.

The radial extent of the flange section, radially on the outside with respect to the sleeve section, preferably arises at least approximately from the sum of the radial extent of the electromagnet arrangement and the radial extent of the rotor and, in addition, from a radial projecting length for the connection of the friction disk clutch to a mating section.

Accordingly, the projecting length or a section of the flange section extends, for example, radially beyond the radial outer side of the rotor, and preferably serves for screwing of the friction disk clutch to the mating section, such as a housing of the auxiliary unit.

A shaft bearing, such as an anti-friction bearing for rotatably mounting the shaft relative to the core component, is preferably present between an inner side of the core component or an inner side of the sleeve section which lies opposite the radially outer circumferential face of the sleeve section in the radial direction, and the shaft or its shaft outer side.

It is advantageous if the core component is configured in such a way that the core component provides a centering mechanism for the rotor bearing unit. In this way, a region of the core component, such as a section on the outside of the sleeve section, is configured as a bearing seat surface with a comparatively high manufacturing accuracy or a high dimensional accuracy or very low tolerances.

In this way, the rotor bearing unit can be aligned exactly with a centrally present shaft longitudinal axis, and an exact fit for the rotor bearing unit on the core component and therefore a high functionality of the friction disk clutch are achieved.

In accordance with one modification of the present invention, the core component is configured in such a way that the core component provides a centering mechanism for the inner bearing. In this way, a region of the core component, such as a section on the inside of the sleeve section, is configured as a bearing seat surface with a comparatively high manufacturing accuracy or a high dimensional accuracy or very low tolerances.

In this way, the inner bearing can be aligned exactly with a centrally present shaft longitudinal axis, and an exact fit for the inner bearing on the core component and therefore a high functionality of the friction disk clutch are achieved.

The core component is advantageously configured in such a way that the core component provides a centering mechanism for the housing section, in particular, for a pump housing section.

Accordingly, a region of the core component, such as a section on the flange section, is a seat surface for mutual support of the housing and the core component with a comparatively high manufacturing accuracy or a high dimensional accuracy or very low tolerances.

In this way, the housing can be aligned exactly with a centrally present shaft longitudinal axis, and an exact fit for the housing on the core component and therefore a high functionality of the friction disk clutch are achieved.

In accordance with one preferred refinement of the present invention, the core component is configured in such a way that the core component specifies a defined gap size for an air gap which is configured between sections of the friction disk clutch which are separated from one another via a material-free region. The air gap is preferably configured in separating regions between sections of the friction disk clutch which lie opposite one another. With a gap width of, for example, approximately one millimeter, the air gap preferably forms an intermediate space between radially or axially opposite sections of the friction disk clutch, one section rotating and the other section being stationary or likewise rotating. In this way, a high structural and functional accuracy of the friction disk clutch is provided by way of the core component in an advantageous or effective and simple way. This also applies, in particular, when, in addition to the defined gap sizes, further sections with very low tolerances for fits or centering mechanisms are provided on the core component.

The material-free gap regions in an axial and/or in a radial dividing region are realized by way of the exactly specified gap sizes. The relevant air gaps can be provided, for example, between the core component and the rotor and/or between the armature plate and the rotor.

The external diameter of the friction disk clutch is advantageously smaller than 120 millimeters, is preferably smaller than 100 millimeters, is preferably smaller than 90 millimeters, is preferably smaller than 85 millimeters, is preferably smaller than 80 millimeters, and is preferably smaller than 70 millimeters. In this way, the friction disk clutch can be used in a relatively flexible manner, in particular, can be of smaller dimensions in the case of a comparable maximum transmission of torque.

In particular, a customary friction disk clutch with an external diameter of the housing of, for example, approximately 83 millimeters can be provided, which clutch has an external diameter of approximately 120 millimeters as a comparable friction disk clutch which is not in accordance with the present invention. The external diameter results, in particular, from the respective radial width of the two bearing arrangements, the core component and the housing.

In addition, the present invention is advantageously directed to an auxiliary unit of an internal combustion engine with an electromagnetic friction disk clutch according to one of the configurations which are discussed in the preceding text. The present invention is preferably directed to an auxiliary unit for cooling the internal combustion engine with a two-speed friction disk clutch, in the case of which the second rotational speed setting is formed as an eddy current clutch if no direct or one-to-one rotational speed transmission from the rotor to the shaft takes place or no frictionally locking connection is set up between the armature disk and the rotor.

Moreover, the present invention relates to a method for assembling an electromagnetic friction disk clutch with a shaft on an auxiliary unit which can be driven by way of the shaft, the friction disk clutch comprising an electromagnet arrangement, a rotor for driving the shaft, and an armature disk which is connected fixedly to the shaft and can be moved in a sprung manner in a direction which is axial with respect to a shaft axis, the electromagnetic friction disk clutch being attached to a housing section of the auxiliary unit, the shaft protruding through an opening in the housing section, and subsequently being attached to a section of the shaft which, in the attached state on the housing section, protrudes on a side which faces away from the friction disk clutch, further components of the auxiliary unit, comprising a dynamic seal and an impeller, being pressed on.

In this way, the assembly of the friction disk clutch is advantageously possible in the case of an advantageous provision or production of the electromagnetic friction disk clutch according to the present invention. It is possible, in particular, for the complete electromagnetic friction disk clutch according to the present invention including the shaft to advantageously be produced with the relevant tolerances at the location of production, and for the functions of the friction disk clutch to be tested. Moreover, the subsequent assembly is comparatively simpler than the previous procedure.

This is technically and economically advantageous, in particular, concerning the manufacturer-side provision of the properties of the friction disk clutch and the assembly with the auxiliary unit. Here, the manufacturer and the production location of the friction disk clutch are as a rule different than the manufacturer and the production location of the auxiliary unit.

Up to now, relevant quality criteria have had to be taken into consideration in the case of the production of the components and the assembly thereof in a manner which is adapted to one another.

For example, up to now a first module, consisting of the rotor, the shaft bearing and a cooling ring, has first of all been connected to a second module in a first step at the location of the production of the friction disk clutch, which second module comprises an armature disk, a spring, a permanent magnet carrier and permanent magnets. The air gaps between the first module and the second module in the axial direction in relation to the shaft do not yet exist and therefore cannot be set.

The assembled unit is thus provided for mounting on the auxiliary unit, and is as a rule delivered, for example, to a second location.

Independently of this and/or at the second location of the assembly of the auxiliary unit, the electromagnet is screwed onto the housing section, such as a pump housing section.

At the same time, two interference fits are set up, between the bearing of the first module and the housing section, such as a pump housing section, and between the second module and the shaft.

The axial air gaps have to be produced correctly during the pressing-on operation. The air gaps concern opposite axial sides of the second module with respect to an associated adjacent axial side of the first module.

Moreover, a first radial air gap between the radially inner section of the electromagnet and a radially adjacent part of the rotor firstly and a second radial air gap between the radially outer section of the electromagnet and an adjacent part of the rotor secondly have to be correct, which is dependent, in particular, on the housing section or the pump housing.

The function of the friction disk clutch can be tested only now in the case of a completely assembled friction disk clutch on the auxiliary unit.

The proposed method according to the present invention is advantageous in contrast to this.

According to the present invention, all the axial and radial air gaps can advantageously be set correctly at the first location, which can be carried out by the manufacturer of the friction disk clutch. Moreover, the clutch manufacturer can test the clutch function, which is essential for the clutch manufacturer. The delivery to the location of the assembly of the friction disk clutch including the shaft with the auxiliary unit only then takes place. There, the friction disk clutch including the shaft merely still has to be screwed onto the housing section or onto the pump housing. The non-critical pressing of the dynamic seal and the impeller onto the shaft then takes place.

BRIEF DESCRIPTION OF THE DRAWINGS

Further features and advantages of the present invention are described in greater detail in the following text on the basis of the exemplary embodiments which are shown diagrammatically in the figures.

DETAILED DESCRIPTION OF THE INVENTION

In the following text and in the figures, the same reference signs are used in part for corresponding elements of different exemplary embodiments.

Figure 1:
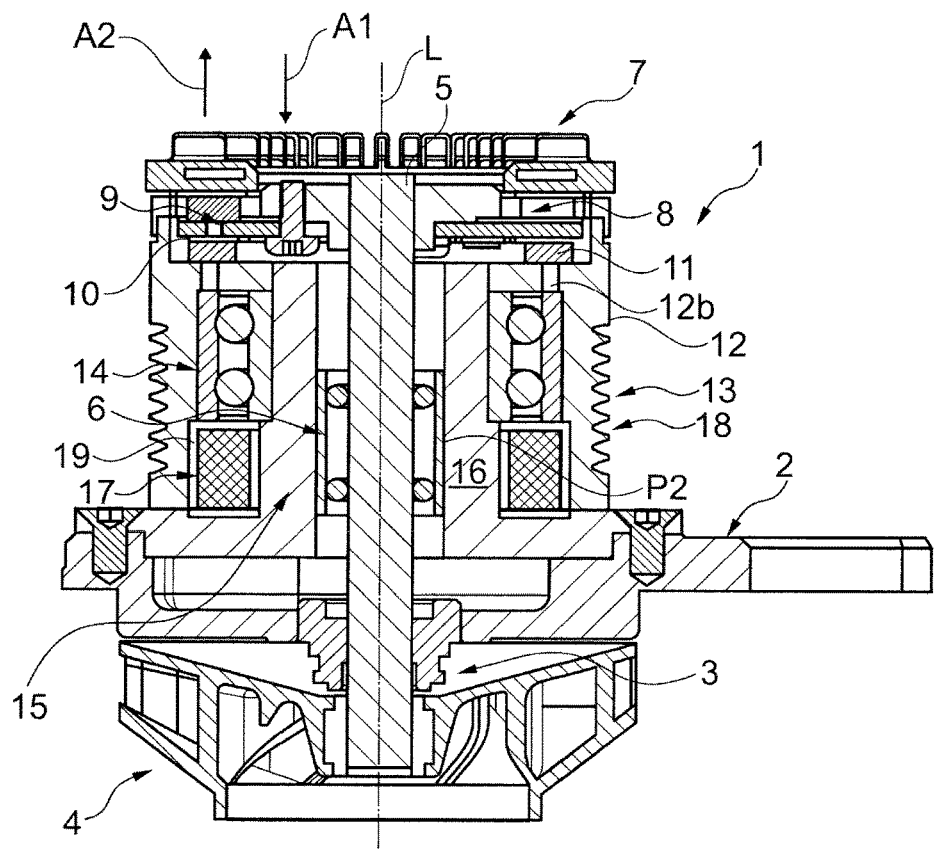
FIG. 1 shows an electromagnetic friction disk clutch according to the present invention with parts of an auxiliary unit in longitudinal section.

FIG. 1 shows an electromagnetic friction disk clutch 1 for an auxiliary unit of an internal combustion engine, the auxiliary unit being configured as a water pump in the exemplary embodiment which is shown. The friction disk clutch 1 is configured as a two-speed friction disk clutch, the known eddy current operating principle not being described in further detail in the following text. A housing section 2 or a pump housing, a dynamic seal 3 and an impeller 4 are shown of the auxiliary unit.

The friction disk clutch 1 comprises a central shaft 5 or a pump shaft with an inner bearing 6 which is configured as an anti-friction bearing and serves as a pump bearing, and a cooling ring 7 which is received on the end side of a rotor 12.

A plurality of permanent magnets 8 which are arranged around the shaft longitudinal axis L are fastened in a manner which is spaced apart circumferentially from one another to a permanent magnet carrier 9 which is screwed fixedly to the shaft 5.

An armature disk 11 is received on an axially elastically movable spring 10 which is likewise connected fixedly to the shaft 5.

The rotor 12 is present for driving the shaft 5 and therefore the auxiliary unit by means of the switchable friction disk clutch 1, with a belt drive section which serves as a belt support 13 for a drive belt (not shown) which acts on said belt support and is guided so as to lie on the outside of the rotor 12. The rotor 12 is mounted rotationally on the outside of a core component 16 which is configured as a magnetic body 15, via a rotor bearing unit 14 which is configured as a rotor anti-friction bearing. The core component 16 preferably consists, for example, of a ferromagnetic material which can be machined. The rotor bearing unit 14 consists of a magnetically poorly magnetizable or non-magnetizable material, such as a ceramic material, in order to avoid a magnetic short circuit.

The rotor bearing unit 14 is offset with respect to an electromagnet arrangement 18 in an axial direction A1 or A2 with respect to the shaft 5. The rotor bearing unit 14 is in overlap Ü with the electromagnet arrangement 18 in the axial direction with respect to the shaft 5 (see FIG. 3). The electromagnet arrangement 18 has a coil 17 with a coil housing 19 which is configured around the coil 17. Sections of the core component 16 form a part of a magnetic body 15 of the electromagnet arrangement 18, that is to say sections which form a part of a magnetic field or are penetrated by magnetic field lines M in the case of an energized coil 17 (see FIG. 5). Accordingly, the core component 16 consists of a magnetically conductive or, for example, a ferromagnetic steel material.

Here, an external diameter D of the friction disk clutch 1 (see FIG. 8) is by way of example 84 millimeters. The external diameter D is specified, in particular, by way of the external diameter of the rotor 12.

Figure 2:
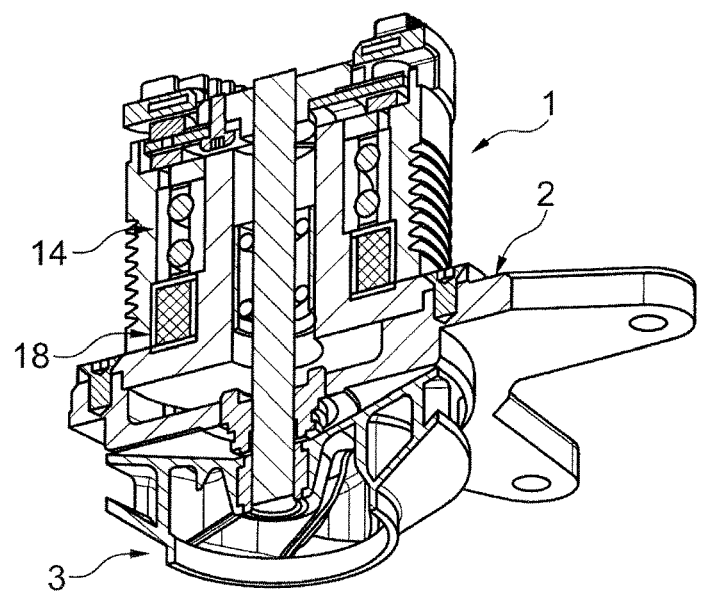
FIG. 2 shows the arrangement according to FIG. 1, obliquely from below in a perspective view.
Figure 3:
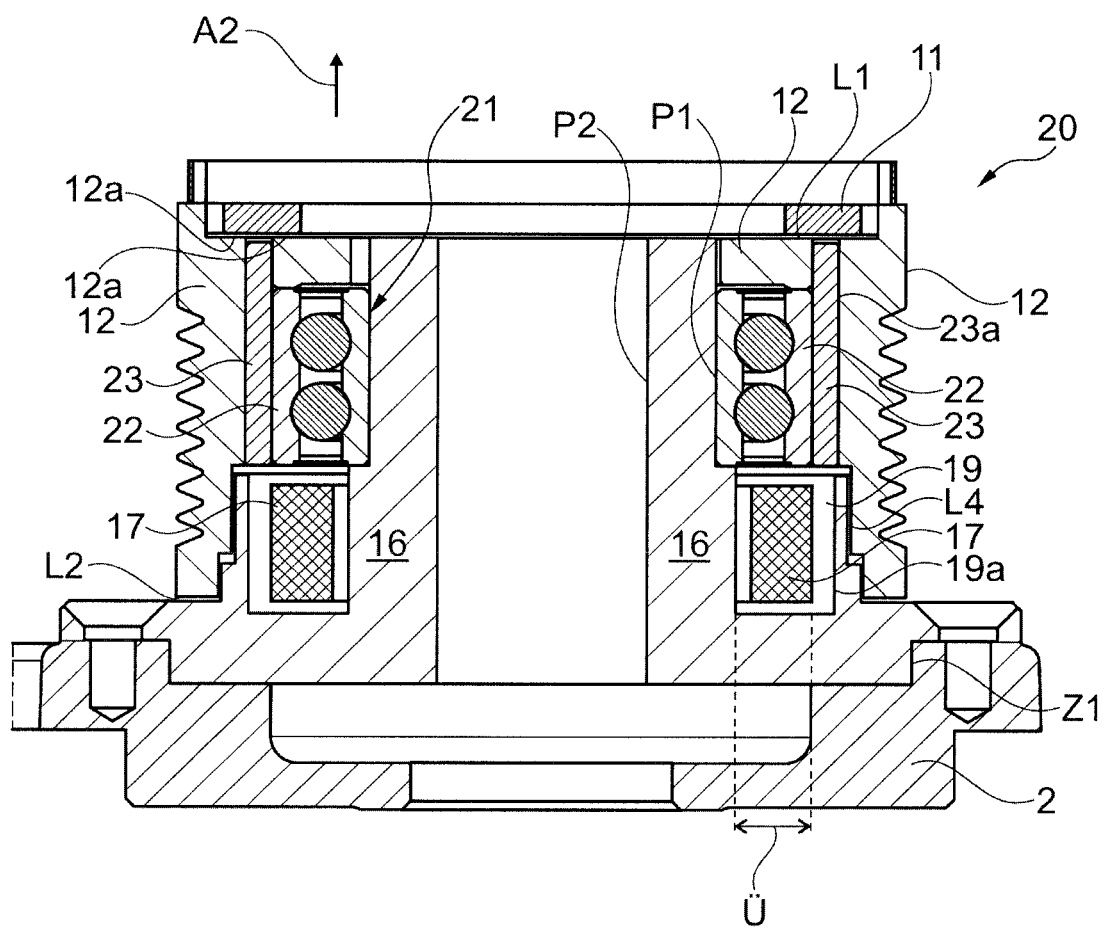
FIG. 3 shows a part of an alternative electromagnetic friction disk clutch without a shaft including its bearing unit, in a highly diagrammatic view in section.
Figure 4:
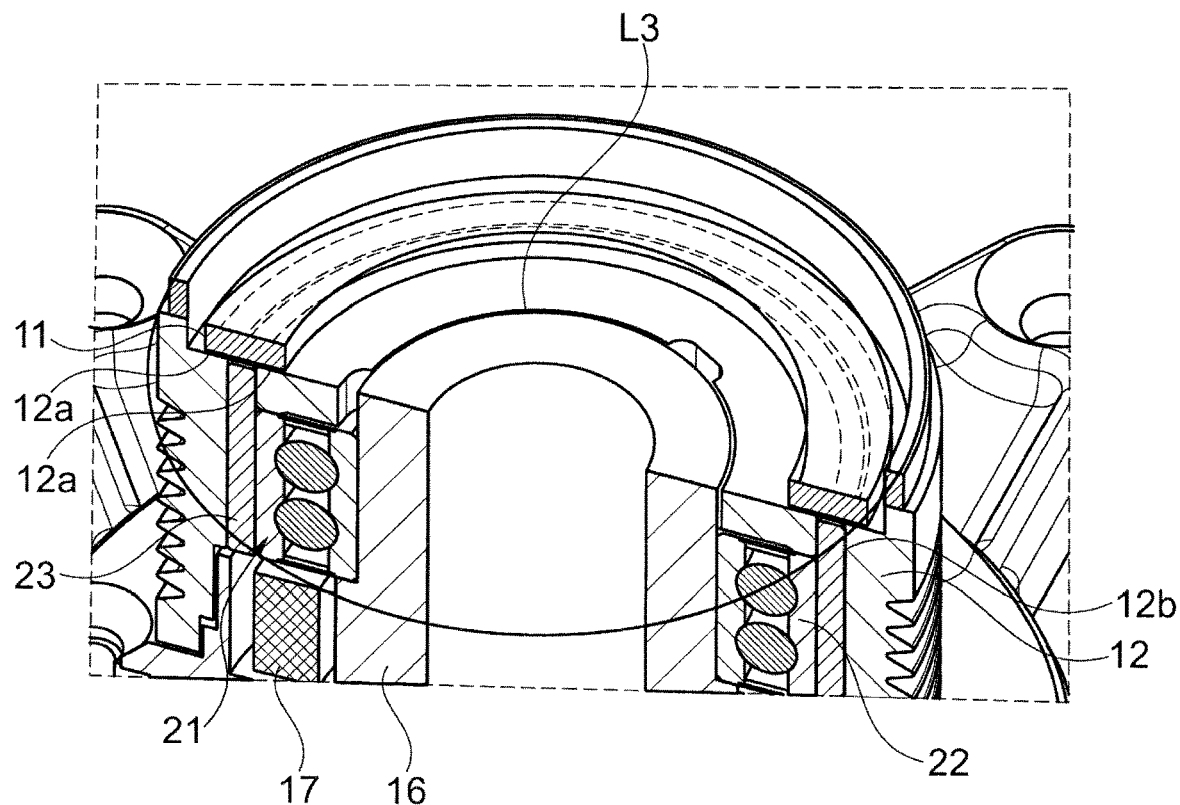
FIG. 4 shows an upper detail of the arrangement according to FIG. 3, obliquely from above in a perspective view.
Figure 5:
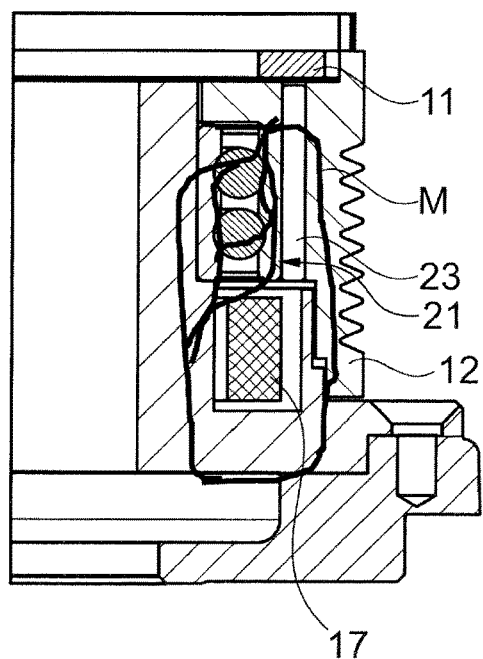
FIG. 5 shows a detail of the arrangement according to FIG. 3 with an indicated magnetic flux course.

One modification of the friction disk clutch 1 according to FIGS. 1 and 2 shows a friction disk clutch 20 according to FIGS. 3-5, a shaft and an inner bearing having been omitted in FIG. 3 in comparison with the friction disk clutch 1 from FIGS. 1 and 2. In particular, the friction disk clutch 20 also has a rotor bearing unit 21 with an overlap U with the electromagnet arrangement 18.

The friction disk clutch 20 is structurally identical to the friction disk clutch 1 apart from the rotor bearing unit 21 and a ring member 23, and the rotor bearing unit 21 made from a magnetically conductive material has, for example, a standard anti-friction bearing such as a twin-row anti-friction ball bearing in contrast to the friction disk clutch 1, in particular, for economic reasons. The ring member 23 which is made, for example, from a magnetically insulating material, such as a non-magnetic steel ring, is present radially on the outside of an outer ring 22 of the rotor bearing unit 21 in order to avoid a magnetic short circuit in the case of an energized coil 17. In this way, a magnetic field which is generated by the energized coil 17 with magnetic flux lines M is influenced in a guided and targeted manner, in order that, in the case of an energized coil 17, the armature disk 11 is attracted effectively onto end-side sections 12a of the rotor 12 in a manner which connects in a frictionally locking way, which is indicated by FIGS. 4 and 5.

The ring member 23 which is configured as an insulation ring preferably does not reach or does not reach substantially with a radial outer side 23a beyond a radial outer side 19a of the coil housing 19 or the electromagnet arrangement 18.

An end side of the ring member 23 does not reach in the axial direction A2 as far as a plane which spans in a manner which is flush with the flat or planar end-side sections 12a of the rotor 12. That end side of the rotor 12 which is directed toward the armature disk 11 is slotted by way of a circumferentially running gap region 12b, it not being possible to see in the figures that the gap region 12b is interrupted by way of a material bridge at one or two points in the circumferential direction, whereby the rotor 12 is in one piece. The ring member 23 reaches with an end-side end section into the gap region 12b.

As, in particular, FIG. 3 illustrates, the result is axial and radial gap regions or material-free gap regions between adjacent sections of the friction disk clutch 20 and in the case of the friction disk clutch 1. The exact configuration of the air gaps can be realized on a single component, namely the core component 16 of the friction disk clutch 1 or 20, by way of, for example, high-precision material removing or turning machining of the core component 16. Accordingly, the core component 16 is a component which is machined by turning into its end state.

The core component 16 can advantageously or preferably be produced with narrow tolerances as a core component which is machined from a starting component and/or as an individual component and/or in one piece and with high precision. The core component 16 or a respective relevant outer side section advantageously provides a high-position fit P1 for the rotor bearing unit 14 or 21, and provides a high-precision fit P2 for the inner bearing 6, and a high-position centering action Z1 for the housing section 2 or the pump housing, by way of corresponding machining of the associated surfaces on the core component 16.

Accordingly, defined gap sizes of the friction shifting clutch 1 or 20 can be specified by way of the core component 16, comprising a first axial gap L1, between the rotor 12 and the armature disk 11, a second axial air gap L2, between the rotor 12 and the core component 16, a first radial air gap L3 and a second radial air gap L4, in each case likewise between the rotor 12 and the core component 16.

Figure 8:
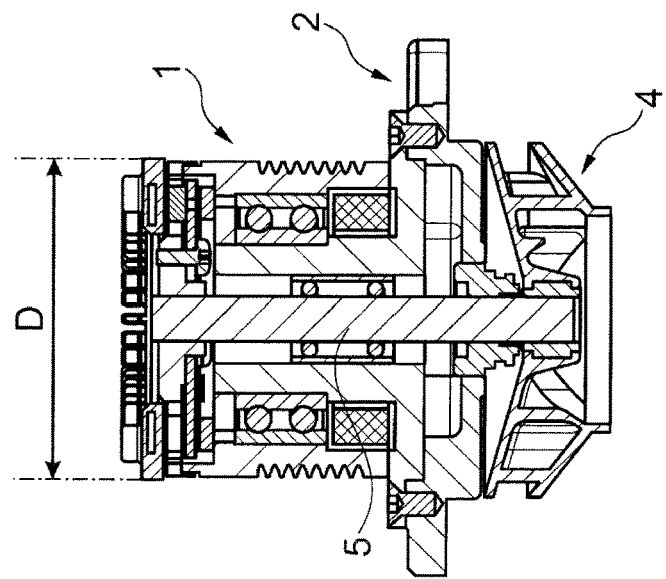
FIG. 8 shows the assembled arrangement after a third mounting step which follows the second mounting step according to FIG. 7.
Figure 7:
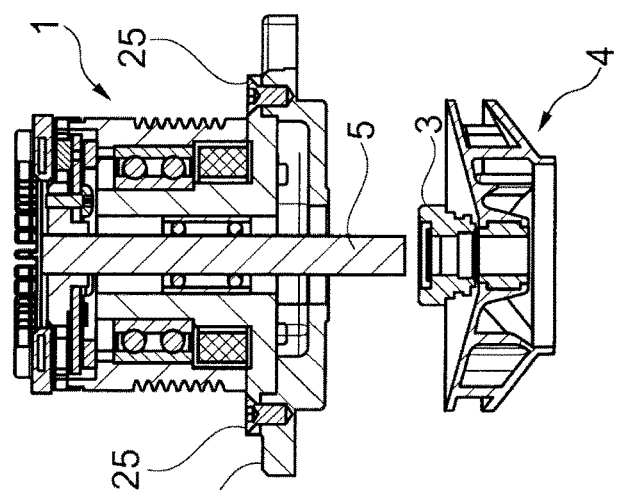
FIG. 7 shows a second mounting step which follows the first mounting step according to FIG. 6.
Figure 6:
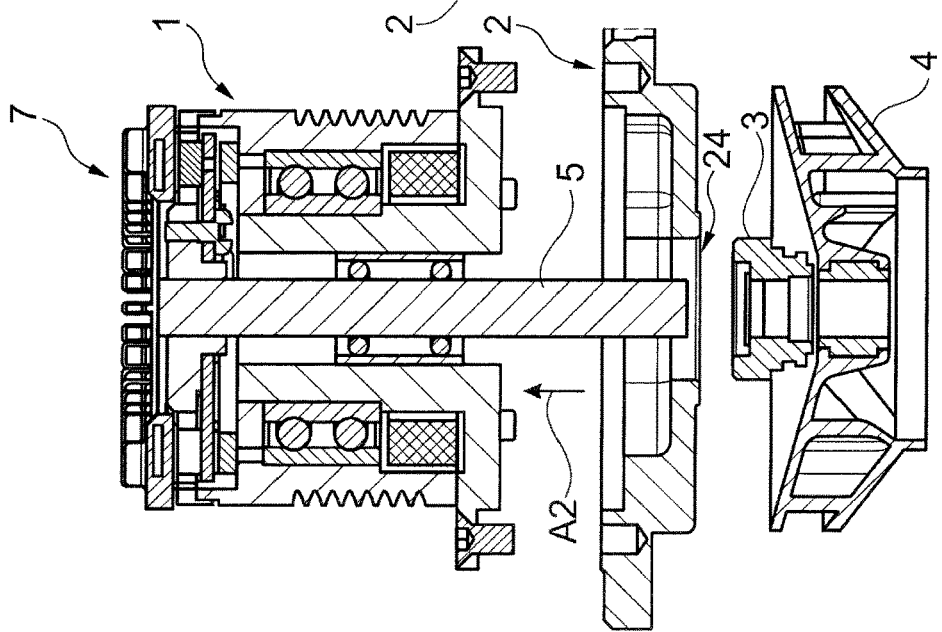
FIG. 6 shows a first mounting step of the assembly of the arrangement according to FIG. 1.

FIGS. 6 to 8 show the advantageous mounting or the assembly of the friction disk clutch 1. The mounting situation which is shown in FIG. 6 is followed by the mounting situation according to FIG. 7 and subsequently the mounting situation according to FIG. 8 in the case of a finally attached friction disk clutch 1.

Here, the friction disk clutch 1 is attached to the housing section 2 of an auxiliary unit such as a cooling water pump.

First of all, the overall friction disk clutch 1 is advantageously assembled with the mounted shaft 5 present centrally therein and the cooling ring 7 at a first location which is as a rule the manufacturing location of the friction disk clutch. Here, the shaft 5 projects or protrudes on that side of the friction disk clutch 1 which faces away from the cooling ring 7. Then, the entire arrangement which is assembled in this way is plugged with the free end of the projecting part of the shaft 5 at the front through a central opening 24 in the housing section 2 (see FIG. 6) or, conversely, the housing section 2 is moved up to the friction disk clutch 1 in a manner which is aligned so as to fit in the direction A2, and the friction disk clutch 1 is connected fixedly to the housing section 2 via screwing means 25 (see upper part in FIG. 7).

Subsequently, the dynamic seal 3 and the impeller 4 are pressed on at that free end of the shaft 5 which projects at the housing section 2 (see FIG. 7). In this way, the shaft 5 is connected fixedly for conjoint rotation to the impeller 4 which can be driven by the shaft 5, which is shown by FIG. 8.

This structural unit is then attached to further sections of the auxiliary unit. A drive belt (not shown) which acts in a torque-transmitting manner on the outside of the belt support 13 of the rotor 12 ensures the driven rotation of the shaft 5 and therefore the impeller 4 during operation of the auxiliary unit.

LIST OF REFERENCE SIGNS

1 Friction disk clutch
2 Housing section
3 Seal
4 Impeller
5 Shaft
6 Inner bearing
7 Cooling ring
8 Permanent magnet
9 Permanent magnet carrier
10 Spring
11 Armature disk
12 Rotor
12*a* Section
12*b* Gap region
13 Belt support
14 Rotor bearing unit
15 Magnetic body
16 Core component
17 Coil
18 Electromagnet arrangement
19 Coil housing
19*a* Outer side
20 Friction disk clutch
21 Rotor bearing unit
22 Outer ring
23 Ring member
23*a* Outer side
24 Opening
25 Screwing means

The invention claimed is:

1. An electromagnetic friction disk clutch with a shaft which, in the assembled state, extends through at least one housing section, the electromagnetic friction disk clutch comprising an electromagnet arrangement that comprises a coil and a coil housing, with each of the coil and the coil housing having an outermost radial width such that the coil is surrounded by the coil housing, a ring member of a locking section, which is made of a non-magnetizable material, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in a frictionally locking manner, the rotor being mounted rotationally by a rotor bearing unit with respect to the housing section and with respect to the shaft, it being possible for a magnetic effect to be generated by way of an energization of the electromagnet arrangement for the connection of the armature disk to the rotor, which magnetic effect moves the armature disk in such a way that the armature disk can be connected to the rotor in a frictionally locking manner, wherein the rotor bearing unit is offset with respect to the electromagnet arrangement in an axial direction with respect to the shaft, the rotor bearing unit being in overlap with the electromagnet arrangement in the axial direction with respect to the shaft, wherein the ring member, which has an outermost radial width, is directly adjacent to a radial outer side of the rotor bearing unit such that the ring member of the locking section and the coil housing are offset so as not to overlap each other in the axial direction with respect to the shaft, and wherein the outermost radial width of the ring member is almost equal to but greater than the outermost radial width of the coil.

2. The electromagnetic friction disk clutch according to claim 1, wherein the locking section extends over the axial length of the rotor bearing unit, as viewed in the axial direction with respect to the shaft.

3. The electromagnetic friction disk clutch according to claim 1, wherein one end of the locking section, which end faces the armature disk, extends within a radial width of a frictionally locking section of the armature disk, as viewed in the radial direction with respect to the shaft.

4. The electromagnetic friction disk clutch according to claim 1, wherein the rotor bearing unit is present between the armature disk and the electromagnet arrangement in the axial direction with respect to the shaft.

5. The electromagnetic friction disk clutch according to claim 1, further comprising a core component which is mounted on the shaft by way of an inner bearing.

6. The electromagnetic friction disk clutch according to claim 5, wherein the rotor is mounted such that it can be rotated relative to the core component by means of the rotor bearing unit.

7. The electromagnetic friction disk clutch according to claim 5, wherein the core component is configured in such a way that the core component provides a centering mechanism for the rotor bearing unit.

8. The electromagnetic friction disk clutch according to claim 5, wherein the core component is configured in such a way that the core component provides a centering mechanism for the inner bearing.

9. The electromagnetic friction disk clutch according to claim 5, wherein the core component is configured in such a way that the core component provides a centering mechanism for the housing section, in particular for a pump housing section.

10. The electromagnetic friction disk clutch according to claim 5, wherein the core component is configured in such a way that the core component specifies a defined gap size for an air gap which is configured between sections of the friction disk clutch which are separated from one another via a material-free region.

11. The electromagnetic friction disk clutch according to claim 1, wherein the external diameter of the friction disk clutch is smaller than 120 millimeters.

12. An auxiliary unit of an internal combustion engine with an electromagnetic friction disk clutch according to claim 1.

13. An electromagnetic friction disk clutch with a shaft which, in the assembled state, extends through at least one housing section, the electromagnetic friction disk clutch comprising an electromagnet arrangement that comprises a coil and a coil housing, with each of the coil and the coil housing having an outermost radial width such that the coil is surrounded by the coil housing, a ring member of a locking section, which is made of a non-magnetizable material, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in a frictionally locking manner, the rotor being mounted rotationally by means of a rotor bearing unit with respect to the housing section and with respect to the shaft, it being possible for the armature disk to be connected to the rotor in a frictionally locking manner by way of a permanent magnet arrangement of the friction disk clutch, it being possible for a magnetic effect to be generated by way of an energization of the electromagnet arrangement for the disconnection of the armature disk from the rotor, which magnetic effect counteracts the magnetic effect of the permanent magnet arrangement in such a way that a movement of the armature disk takes place in such a way that the frictionally locking connection of the armature disk to the rotor can be canceled, wherein the rotor bearing unit is offset with respect to the electromagnet arrangement in an axial direction with respect to the shaft, the rotor bearing unit being in overlap with the electromagnet arrangement in the axial direction with respect to the shaft, wherein the ring member, which has an outermost radial width, is directly adjacent to a radial outer side of the rotor bearing unit such that the ring member of the locking section and the coil housing are offset so as not to overlap each other in the axial direction with respect to the shaft, and wherein the outermost radial width of the ring member is almost equal to but greater than the outermost radial width of the coil.

14. An electromagnetic friction disk clutch with a shaft which, in the assembled state, extends through at least one housing section, comprising an electromagnet arrangement, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in frictionally locking manner, the rotor being mounted rotationally by a rotor bearing unit with respect to the housing section and with respect to the shaft, it being possible for a magnetic effect to be generated by way of an energization of the electromagnet arrangement for the connection of the armature disk to the rotor, which magnetic effect moves the armature disk in such a way that the armature disk can be connected to the rotor in a frictionally locking manner, wherein the rotor bearing unit is offset with respect to the electromagnet arrangement in an axial direction with respect to the shaft, the rotor bearing unit being in overlap with the electromagnet arrangement in the axial direction with respect to the shaft, and wherein the rotor bearing unit consists of a non-magnetizable material, for influencing a magnetic flux in the case of energization of the electromagnet arrangement.

15. A method for assembling an electromagnetic friction disk clutch with a shaft on an auxiliary unit which can be driven by way of the shaft, the friction disk clutch comprising an electromagnet arrangement that comprises a coil and a coil housing, with each of the coil and the coil housing having an outermost radial width such that the coil is surrounded by the coil housing, a ring member of a locking section, which is made of a non-magnetizable material, a rotor for driving the shaft, and an armature disk which is connected fixedly to the shaft and can be moved in a sprung manner in a direction which is axial with respect to a shaft axis, the rotor being mounted rotationally by means of a rotor bearing unit with respect to a housing section of the auxiliary unit and with respect to the shaft, with the ring member, which has an outermost radial width, being directly adjacent to a radial outer side of the rotor bearing unit such that the ring member of the locking section and the coil housing are offset so as not to overlap each other in the axial direction with respect to the shaft, and the outermost radial width of the ring member is almost equal to but greater than the outermost radial width of the coil, the electromagnetic friction disk clutch being attached to the housing section of the auxiliary unit, the shaft protruding through an opening in the housing section, and subsequently being attached to a section of the shaft which, in the attached state on the housing section, protrudes on a side which faces away from the friction disk clutch, further components of the auxiliary unit, comprising a dynamic seal and an impeller, being pressed on.

16. An electromagnetic friction disk clutch with a shaft which, in the assembled state, extends through at least one housing section, comprising an electromagnet arrangement, a rotor for driving the shaft, and an armature disk which is connected fixedly to the shaft and can be moved in a sprung manner in a direction which is axial with respect to a shaft axis, with the result that, in a shifting state of the friction disk clutch, the armature disk can be connected to the rotor in a frictionally locking manner, the rotor being mounted rotationally by means of a rotor bearing unit with respect to the housing section and with respect to the shaft, it being possible for the armature disk to be connected to the rotor in a frictionally locking manner by way of a permanent magnet arrangement of the friction disk clutch, it being possible for a magnetic effect to be generated by way of an energization of the electromagnet arrangement for the disconnection of the armature disk from the rotor, which magnetic effect counteracts the magnetic effect of the permanent magnet arrangement in such a way that a movement of the armature disk takes place in such a way that the frictionally locking connection of the armature disk to the rotor can be canceled, wherein the rotor bearing unit is offset with respect to the electromagnet arrangement in an axial direction with respect to the shaft, the rotor bearing unit being in overlap with the electromagnet arrangement in the axial direction with respect to the shaft, and wherein the rotor bearing unit consists of a non-magnetizable material, for influencing a magnetic flux in the case of energization of the electromagnet arrangement.

* * * * *